(12) United States Patent
Kaplan (10) Patent No.: US 11,553,329 B2
(45) Date of Patent: Jan. 10, 2023

(54) SYSTEM AND METHOD FOR COMPATIBILITY ANALYSIS AND PERFORMANCE VERIFICATION

(71) Applicant: JustKibbitz Corp., Asheville, NC (US)

(72) Inventor: Jeffrey B. Kaplan, Asheville, NC (US)

(73) Assignee: JustKibbitz Corp., Asheville, NC (US)

( * ) Notice: Subject to any disclaimer, the term of this patent is extended or adjusted under 35 U.S.C. 154(b) by 21 days.

(21) Appl. No.: 17/410,385

(22) Filed: Aug. 24, 2021

(65) Prior Publication Data

US 2022/0070656 A1 Mar. 3, 2022

Related U.S. Application Data

(60) Provisional application No. 63/070,620, filed on Aug. 26, 2020.

(51) Int. Cl.
| | |
|---|---|
| *H04B 7/00* | (2006.01) |
| *H04W 8/20* | (2009.01) |
| *H04W 12/69* | (2021.01) |
| *G06Q 20/32* | (2012.01) |
| *H04W 4/80* | (2018.01) |

(52) U.S. Cl.
CPC .......... *H04W 8/20* (2013.01); *G06Q 20/3226* (2013.01); *G06Q 20/3278* (2013.01); *H04W 4/80* (2018.02); *H04W 12/69* (2021.01)

(58) Field of Classification Search
CPC ......... H04W 8/20; H04W 4/80; H04W 12/69; G06Q 20/3226; G06Q 20/3278

USPC ........................................................ 455/41.2
See application file for complete search history.

(56) References Cited

U.S. PATENT DOCUMENTS

| | | | | |
|---|---|---|---|---|
| 8,457,651 | B2* | 6/2013 | Forutanpour | H04M 1/72412 |
| | | | | 345/158 |
| 11,490,260 | B1* | 11/2022 | Shoemaker | H04W 48/16 |
| 2002/0090911 | A1* | 7/2002 | Evans | H04W 8/18 |
| | | | | 455/41.2 |
| 2003/0228842 | A1* | 12/2003 | Heinonen | H04L 67/306 |
| | | | | 455/411 |
| 2022/0070656 | A1* | 3/2022 | Kaplan | G06Q 20/3226 |

* cited by examiner

*Primary Examiner* — April G Gonzales
(74) *Attorney, Agent, or Firm* — The Van Winkle Law Firm; William G. Needy (57) ABSTRACT

A method (200) for compatibility analysis and performance verification. Profile data is received (210) for a first profile from a first device and for other profiles from other devices, including a profile received from a second device. A request is received (215) from the first device to identify a profile with profile data compatible with the profile data of the first profile. The profile data of the first profile is compared (220) with profile data of the other profiles to identify compatibility, and the compatible profiles are reported to the first device. A selection of a compatible profile is received (225) from the first device. A request for an item is received (315) from the first device. An instruction is sent regarding the item (320) to the third device. A confirmation regarding the instruction is received (330) from the fourth device. The item is enabled (335).

20 Claims, 4 Drawing Sheets

SYSTEM AND METHOD FOR COMPATIBILITY ANALYSIS AND PERFORMANCE VERIFICATION

CROSS-REFERENCE TO RELATED APPLICATION

This application claims priority to U.S. Provisional Patent Application Ser. No. 63/070,620 filed on Aug. 26, 2020, entitled "System for Compatibility Analysis and Performance Verification", the disclosure and drawings of which are hereby incorporated herein in their entirety by reference.

BACKGROUND

Systems which attempt to match characteristics are often unreliable because the data which is input into the system is inaccurate. Further, performance verification is often difficult.

SUMMARY

A system and a method for compatibility analysis based on independent input, and for verification of performance, are disclosed.

DETAILED DESCRIPTION

Information posted by an individual about a product or service provided by that individual, or about the individual itself, may be exaggerated, misleading, or even completely false. This problem is compounded when there are two individuals who have no personal knowledge of each other and are relying upon information posted on a website or platform, such as a dating or matchmaking platform. As described herein, two persons, not the particular individuals, confer to determine possible compatibility between the particular individuals. If those persons agree upon the possible compatibility, a pre-paid meeting or date is arranged for the individuals. In order for the prepayment to be activated, however, the two individuals must perform certain task(s). If the two individuals do not meet and perform the task(s) then the prepayment is not activated. Thus, a single individual cannot fake the encounter and use the prepayment in a manner which thwarts the intentions of the two persons arranging the meeting.

Figure 1:
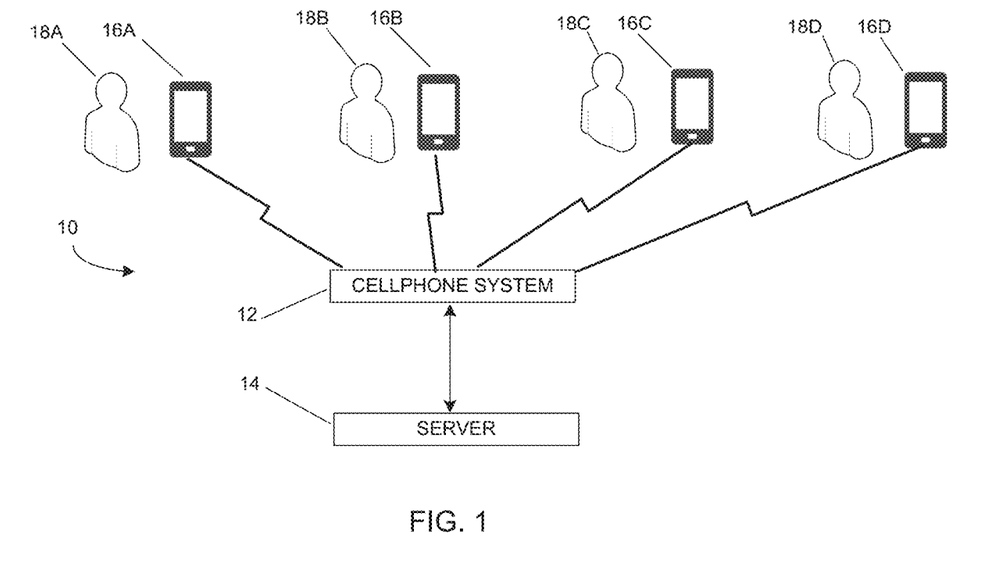
FIG. 1 is a block diagram of the system.
Figure 4:
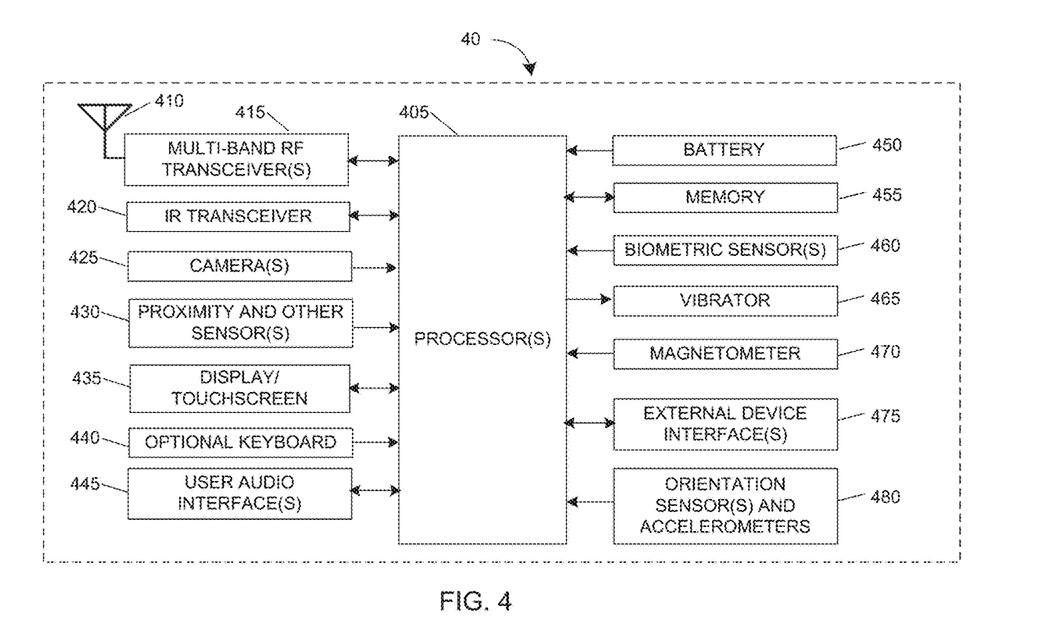
FIG. 4 is a block diagram of a typical smartphone.

FIG. 1 is a block diagram of the system 10 showing a cellular telephone system 12 (which may be referred to herein as a cellular telephone network or a cellphone system), a server 14, and a plurality of cellular communication devices 16A-16D, referred to hereinbelow in the singular as a smartphone 16 or in the plural as smartphones 16, as the context may require. A smartphone 16, as that term is used herein, is a cellular telephone, tablet, or other handheld portable communication device with additional capabilities, such as texting, Internet browsing, camera, picture display, video display, running application programs, GPS or other location determining capabilities, etc., as shown in FIG. 4 and described in the accompanying text therefor.

Also shown are a plurality of persons 18A-18D, who are operators of the smartphones 16A-16D, respectively. Two persons, for example, persons 18A, 18B, such as but not limited to two mothers, each have a relative 18C, 18D, respectively, such as a child, brother, sister, parent, or a good friend, who are single. Persons 18A and 18B wish for persons 18C and 18D, respectively, to have a good friend to be with, and/or to date, and/or to become married to. Person 18C and/or person 18D, however, may not know a person suitable as a companion, may not have the initiative to find a companion, may be too busy to try to find a companion, and/or may be averse to, or may have been unsuccessful with respect to, a dating service.

Person 18A therefore uses smartphone 16A to log on to the compatibility website, hosted by server 14, and to seek out similarly-situated or inclined people. Person 18B takes a similar action using smartphone 16B. Server 14 asks for and compares certain characteristics provided by persons 18A and 18B, such as the city, or the area of a city, or a state, or a region, where persons 18A and 18B would like to find a companion for persons 18C and 18D. For example, if person 18C lives in Denver, then person 18A would be looking to contact a person 18B who has the relative or friend 18D who lives in or near Denver, rather than a person 18D who lives far away. If server 14 determines that the specified characteristics are similar or compatible, then server 14 suggests that persons 18A and 18B communicate with each other, via server 14 and/or directly.

Alternatively, persons 18A and 18B may become aware of each other through family, friends, acquaintances, social media, or some other manner.

In any event, persons 18A and 18B then discuss whatever things they wish to discuss in order to determine, as best as possible, that the other person is interested in the same result and is not a scammer, stalker, opportunist, etc.

Persons 18A and 18B then discuss the characteristics of persons 18C and 18D, the characteristics of a person who might be compatible with persons 18C and 18D, and/or other factors and feelings. If persons 18A and 18B make a mutual decision that persons 18C and 18D might be compatible, then the server 14 will provide a listing of gift cards redeemable (usable) at locations near persons 18C and 18D. The locations are preferably directly related to the physical locations of persons 18C and 18D.

Thus, a compatibility analysis (persons 18C and 18D) is based on third person input (persons 18A and 18B) and verification of characteristics.

Once persons 18A and 18B agree upon an acceptable location(s) and an amount for the gift card then they purchase a gift card so that persons 18C and 18D meet under a controlled condition. The gift card may be purchased with pre-paid credits or by using a debit or credit card at the time of purchase. Once persons 18A and 18B have purchased the gift card then the server 14 will send a notification of the gift card to persons 18C and 18D.

Persons 18C and 18D are adults, and so cannot be made to agree to use the gift card or to meet. Therefore, in one implementation, each person 18C, 18D has the option to reject the gift card, at which point one or more of the other persons 18 would be notified that the gift card has been rejected. Persons 18A and 18B might then receive a partial or complete refund of the purchase amount. In another implementation, both persons 18C and 18D must accept the gift card within a specified period of time. The period of time for acceptance might be fixed by the server 14 or might be selected by persons 18A and 18B. If the gift card is not accepted by both persons 18C and 18D then all persons 18 would be notified that the gift card has not been timely accepted. Persons 18A and 18B might then receive a partial or complete refund of the purchase amount.

The controlled condition might be, for example, a gift card that can be activated to allow the purchase of a product (coffee, a dessert, an appetizer, a meal, etc.) or a service (a movie, a concert, an event, etc.). The controlled condition might also be one or more particular locations, or use (not just acceptance) of the gift card by a time period specified by persons 18A and 18B. Preferably, persons 18A and 18B equally share the cost of the gift card. In another implementation, one of persons 18A or 18B may pay more of the cost than the other person, or even all of the cost.

There is a natural resistance in many people to an arranged meeting because they do not want to spend money on a person they do not know or find that they do not like. The gift card helps to overcome this natural resistance because persons 18C and 18D do not have to spend any money as long as they stay within the limits of the gift card. Thus, a person 18C or 18D is getting free passage to the product or service by simply agreeing to participate in that product or service with the other person.

A person 18C or 18D might, however, try to thwart the intent of the donor 18A or 18B by simply using the gift card for a product or service for himself or herself, or even with another person, rather than using the gift card along with the intended other person 18C or 18D. To reduce this possibility, collaboration between persons 18C and 18D is required to activate the gift card. Once the gift card is purchased (and accepted if acceptance is required), a notification will be sent to persons 18C and 18D, but the gift card cannot be "activated" (revealing the amount of funds on the gift card for use) until persons 18C and 18D perform at least one specified interaction. In another implementation, the gift card cannot be activated until persons 18C and 18D perform two or more specified interactions.

Persons 18C and 18D then converse (via text, email, telephone call, social media, server 14, etc.) to discuss and agree upon a time and/or place to meet and use the gift card. Once persons 18C and 18D meet then they perform the specified interaction(s) and the card is then activated. They can use the gift card to purchase the product(s) and/or service(s) specified in conjunction with the purchase of the gift card by persons 18A and 18B. The system then preferably sends persons 18A and 18B a notice when the gift card has been activated and/or when the gift card has been used.

Figure 2:
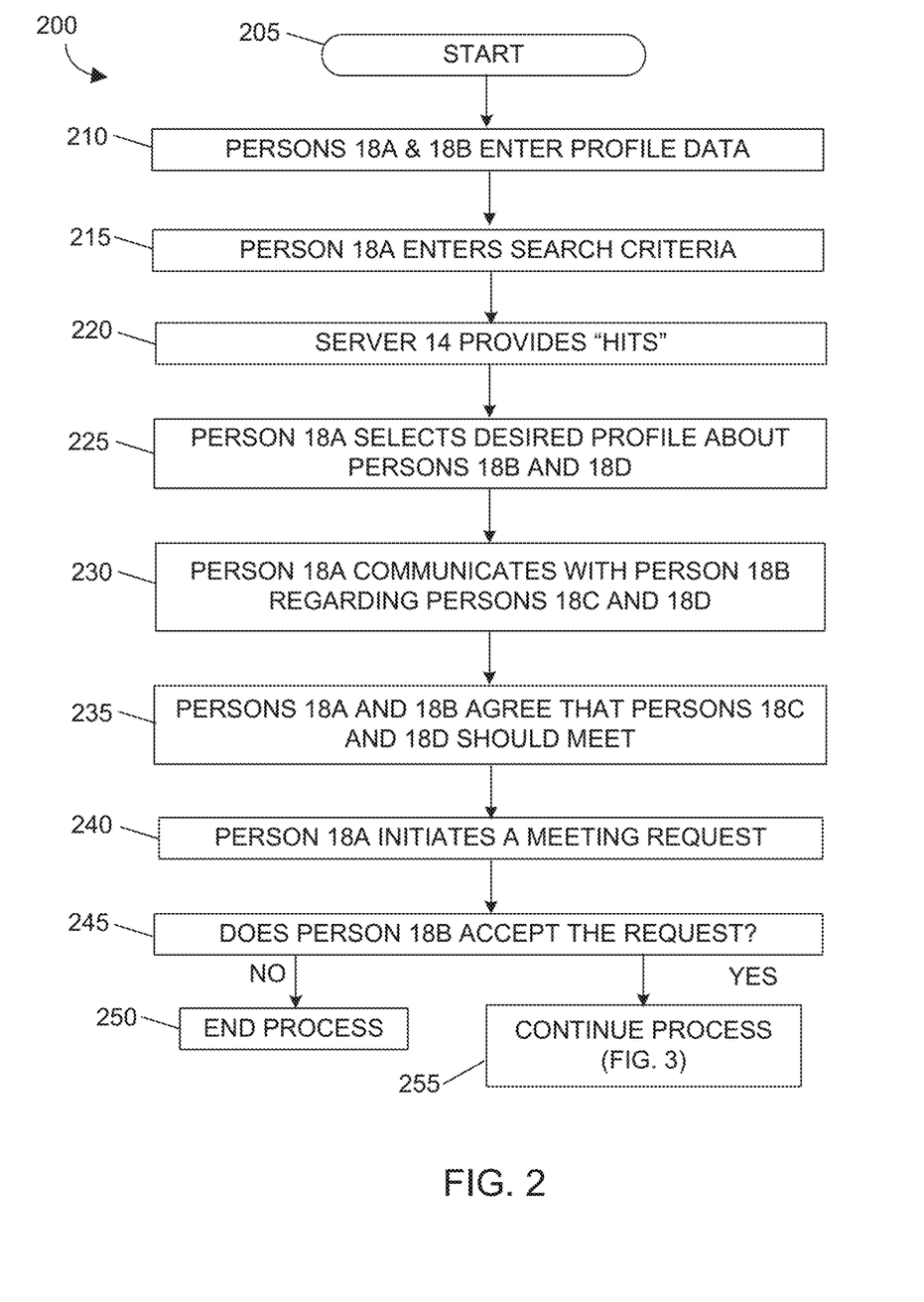
FIG. 2 is a flow chart of a part of the overall process.

FIG. 2 is a flow chart of a part of the overall process 200 for persons 18A and 18B to set up a meeting between persons 18C and 18D.

The process 200 may start 205 whereby person 18A logs into server 14, enters 210 profile data (information) about himself/herself, such as relationship to person 18C (mother, father, brother, sister, aunt, uncle, child, friend, etc.), possibly age or age range, location, ethnicity, religion or preferences. Person 18A also preferably at this time enters profile data about person 18C, such as male, female, age or age range, location, education, ethnicity, religion, desire to have children, whether pets are acceptable (specifying dog, cat, big dog, small dog, outside cat, inside cat, bird, etc.), etc. Person 18B does similarly. Thus, server 14 accumulates a database of persons and associated profile data.

Person 18A then enters 215 desired search criteria, such as relationship, age or age range, location, etc., to locate one or more persons 18B of similar interest. For example, person 18A may be the mother of person 18C, so person 18A might want to communicate with another mother. Or, person 18A may be of a particular religion or ethnicity and wants to preserve that culture, so person 18A will be looking for a person 18B who has the same religion and/or ethnicity. Person 18A preferably also enters search criteria for person 18D, such as age or age range, location, education, desire to have children, pets, etc.

The server 14 searches the characteristics of persons in its database to locate one or more persons that fit the search profile data specified by person 18A and presents 220 one or more profiles of possible hits (persons 18B) to person 18A.

Person 18A selects 225 a profile to view more information about person 18B and possibly person 18D. Person 18A may view one, some, or all of the hits before finding a profile that indicates that a person 18D may be a good match for person 18C. In contrast with conventional dating sites, person 18A is neither entering profile data nor entering search criteria to find a date or match, i.e., person 18B, for himself/herself.

Person 18A communicates 230 with person 18B regarding persons 18C and 18D so that they can exchange more information about, and discuss, persons 18C and 18D. The communication is preferably via the server 14 but, if persons 18A and 18B desire, the communication could also be via text, telephone, email, or a social media platform where they can communicate privately.

Assume now that person 18A and person 18B agree 235 that persons 18C and 18D should meet, for example, should go on date.

Person 18A initiates 240 a meeting request through the server 14. This positive step provides person 18A the opportunity to think again about persons 18B and 18D.

When person 18B receives the meeting request person 18B may either 245 accept or reject the request. This positive step provides person 18B the opportunity to think again about persons 18A and 18C.

If person 18B rejects the meeting request then person 18A is notified of that by server 14 and the process is ended 250. Person 18A may then go back and look at another profile that was provided by the previous search, or person 18A may decide to alter the search criteria.

Figure 3:
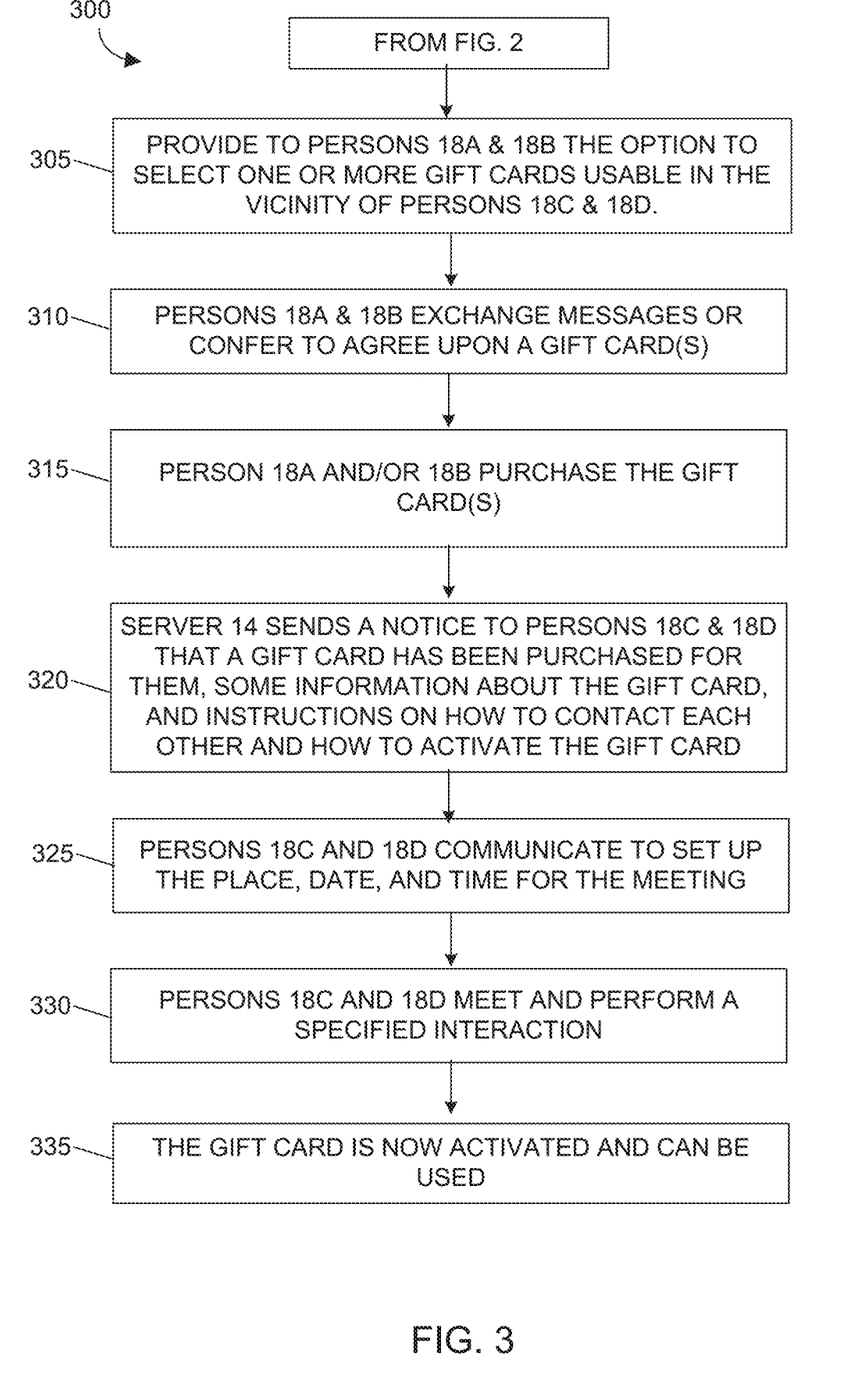
FIG. 3 is a flow chart of another part of the overall process.

If person 18B accepts the meeting request then the process continues 255 at FIG. 3.

FIG. 3 is a flow chart of another part 300 of the overall process for persons 18A and 18B to set up a meeting between persons 18C and 18D.

Once the meeting request is accepted, the server will provide 305 the option to select one or more of a variety of gift cards usable at locations in the vicinity of persons 18C and person 18D. The locations are related to (determined at least in part by) the physical location of persons 18C and 18D.

Persons 18A and 18B exchange 310 messages via the server 14, and/or confer using other communication techniques, such as those mentioned above, to decide and agree upon a gift card or two or more gift cards.

Although persons 18A and 18B may decide that one gift card is enough effort from their side, they may also decide to purchase, for example, two gift cards, so as to encourage a follow-up meeting after the initial meeting, so as to hopefully further the relationship between persons 18C and 18D.

Persons 18A and 18B then make 315 the purchases (pay for the gift card(s)) from server 14 with pre-paid credits, credit cards, debit cards, an electronic banking money transfer application, etc.

Server 14 then sends 320 a notice to persons 18C and 18D that a gift card has been purchased for them so that they can meet, some information about the gift card, and instructions on how to contact each other (via server 14) and how to activate the gift card. If two or more gift cards were purchased then server 14 preferably only discloses the first gift card at that time, and then notifies persons 18C and 18D about the second gift card only after the first gift card has been used. Such notification may be immediately after the first gift card has been used, or at some predetermined time after the first gift card has been used. The predetermined time may have been selected by persons 18A and 18B, or may be a server 14 default setting.

Persons 18C and 18D then communicate 325, preferably via the server 14, but communications after the first communication could be via some other communication technique(s) if they wish to exchange communication information (phone number, email address, etc.). Persons 18C and 18D then set up the place, date, and time for the meeting, preferably via the server 14.

Once persons 18C and 18D meet 330, as arranged, they must perform a specified interaction in order to activate or unlock the gift card so that it can be used.

Once the specified interaction(s) have been performed, the server 14 activates 335 the gift card and it can be used by persons 18C and 18D to purchase the products and/or services indicated by the gift card.

The specified interaction accomplishes two purposes. The specified interaction reduces or eliminates the possibility that a person 18C will the gift card for himself/herself without meeting the other person 18D. The specified interaction also forces the persons 18C and 18D to work together to unlock the gift card, and this can boost the relationship between them. Some examples of specified interactions are:

Server 14 provides person 18C with a unique code, and provides person 18D with a unique link. Person 18D accesses the link, and enters Person 18C's code at the link. Or, Person 18D provides the link to Person 18C, who accesses the link, and enters the code at the link.

Person 18C must connect his/her headphones to person 18D's smartphone, such as by inserting the plug for his/her headphones into person 18D's headphone jack, connecting his/her headphones via Bluetooth, connecting his/her headphones via some other interface, or vice versa (person 18D taking the action).

Person 18C and person 18D must rub/bump/slide their phones together/against each other.

Person 18A and person 18B provide trivia questions, and answers, about persons 18C and 18D to the server 14. Person 18C connects to server 14, receives trivia questions about person 18D, and must correctly answer at least some predetermined number of trivia questions about person 18D, and/or person 18D connects to server 14, receives trivia questions about person 18C, and must correctly answer at least some predetermined number of trivia questions about person 18C.

Person 18C must take a picture of himself/herself (currently known as a "selfie") with person 18D, and send it to both person 18A and person 18B, through the server 14 or using an application downloaded from the server 14.

Person 18C and person 18D must play a game of tic-tac-toe (or some other game specified by person 18A, person 18B, or selected by the server 14), through the server 14 or using an application downloaded from the server 14.

Person 18C and person 18D must answer get-to-know-you/icebreaker questions, through the server 14 or using an application downloaded from the server 14.

Person 18C and person 18D must follow this service, or another service specified by person 18A and/or person 18B, on social media.

Person 18C and person 18D download an application from server 14 and then follow each other on social media (the application verifies the following and reports it to the server 14).

Person 18C and/or person 18D connect to the server 14 or download an application from server 14. A code is entered into person 18D's phone, and/or a code is entered into person 18C's phone. The code may be entered by the person owning the phone, or by the other person, as desired to accommodate secrecy and/or privacy concerns. The code may be, for example, the birth month and date of the other person, or a code selected by person 18A or person 18B, or a code selected by the server 14. The downloaded application allows the phones to communicate with the server 14 to provide the code(s) to the server 14 for verification.

Person 18C and/or person 18D connect to the server 14 or download an application from server 14. Person 18C scans person 18D's face with the application, and/or person 18D scans person 18C's face with the application. The application may be a proprietary facial recognition scanner, or may communicate with a proprietary facial recognition scanner on server 14. The scanned facial image is then compared with a baseline facial image to ensure that person 18C and/or person 18D are who they say they are. The baseline facial image may have been provided by person 18A, by person 18B, previously provided by the person 18C, 18D whose face is being scanned, or downloaded by accessing social media websites and searching for the person.

Thus, performance (meeting) is verified.

The gift card provides a base level of funding for a product or service, but the persons 18C and 18D can supplement the base level of funding with their own funds to purchase a higher level product or service or more of a product or service.

Preferably, the gift card is an electronic gift card, and not a physical card.

FIG. 4 is a block diagram of a typical smartphone 40 such as would be used by persons 18C and 18D, and such as might be used by persons 18A and/or 18B instead of a computer.

For example, a smartphone 40 will have many, if not all, of the following components: one or more processor(s) 405; one or more RF antennas 410; multiple RF transceivers and/or a multi-band RF transceiver 415, which can also include one or more receive-only devices such as a GPS receiver or an FM radio receiver; an IR transceiver 420; one or more cameras 425; proximity and other sensors 430, such as laser scanning and mapping technology, a barometer, ambient light sensor, movement detector, fingerprint sensors, etc.; a display 435, which may be a touchscreen; an optional keyboard 440; user audio interface(s) 445, such as a microphone, a speaker, a headset/microphone jack, a headset/microphone transceiver, such as a Bluetooth transceiver, the IR transceiver 420, or other interface; battery 450; memory 455; one or more biometric sensors 460; a vibrator 465; a magnetometer 470; external device interface (s) 475, such as one or more jacks or contact connectors, a Bluetooth transceiver, the IR transceiver 420; and orientation sensor(s), vibration sensor(s), and accelerometer(s) 480; some of which components listed above may fall into two or more of the types listed above.

A smartphone 40 with one or more of the different types of sensors, input, and output components listed above, such as but not limited to 425, 430, 435, 445, 460, 465, 470, 475, and 480, mentioned above, is necessary to accomplish some of the specified actions mentioned above by persons 18C and 18D in order to activate the card. For example: one person connecting her/her headphone to the other person's smartphone requires a plug, a jack, or some other type of connection 445; one person rubbing/bumping/sliding his/her phone 40 against the other person's phone 40 requires a vibration sensor 480, an accelerometer 480, and/or a proximity detector 430; playing a game requires a touchscreen display 435; scanning and sending facial images requires a camera 425; etc. Thus, the process steps to be performed by persons 18C and 18D cannot be accomplished by merely thinking about something, talking about something, agreeing with another person about something, or taking an action without a smartphone.

In an embodiment, as discussed above, persons 18A and 18B use smartphones 16A and 16B, respectively. In another embodiment, person 18A and/or person 18B may use a non-handheld electronic device, such as a desktop computer, for communications with the server 14.

The system and methods described herein provide for compatibility analysis and performance verification. In one real world setting, the process directly addresses some known problems of dating, matchmaking, and dating sites. Dating sites have existed since the 1990's and rely on individuals to be their own advocate in finding a partner. This has led to various unscrupulous tactics like posturing, puffing, threatening, catfishing, sexting, and ghosting. In the real world, some of these might be considered to be fraud, harassment, or even criminal activity. Furthermore, the proliferation of dating sites and apps leads to an out-of-balance supply and demand paradigm. Some people may sign up on several different web sites just in the hope that a real match has also signed up on some website. However, less than 20% of "matches" ever becomes a real-life date. Sometimes people get "cold feet," sometimes they decide they don't want to spend the money, sometimes they decide that they really are reluctant to go out with a completely unknown stranger, and some people are addicted to the dating site itself, or exchanging messages or pictures, rather than being actually interested in dating.

In contrast to individuals posturing and puffing up themselves so as to get a date with someone who would not normally agree to a date, two individuals who do not stand to directly gain from the date are the ones who arrange the date. Thus, the profiles are based on independent input. A problem that then arises is how to get the two individuals to actually go on a date, that is, how to overcome the reluctance to go on a date with, and spend money on, a complete stranger. Single millennials who have responded to a survey indicate that they would be willing to go on a date set up by their mother roughly 50% of the time. But, if the date is pre-paid so that the only thing that they have to lose is time, then the date acceptance rate increases to over 90%.

The present process helps two individuals 18A, 18B to prompt two other individuals 18C, 18D to go on a "redeemable" date, i.e., a pre-paid date that is only redeemable when both parties, for whom the date was "purchased" in the form of a specialized gift card(s) or voucher(s), are in the same place at the same time to use the gift card or voucher together.

In an implementation of the present process, a user 18A (generally a parent, but can be anyone representing another individual 18C) on a website or application (web-based technology) may match with another user 18B (also representing another, yet separate individual 18D). After these two users confer, they may agree that the two individuals should meet, so they together decide to purchase a gift card to be used by the two individuals. A notification is then sent 320 to the individuals 18C, 18D, but the gift card cannot be activated, such as by revealing the amount of funds on the gift card for use, until the individuals 18C, 18D perform some kind of specified interaction 330.

As an example, two mothers 18A, 18B are using the web site operated by the server 14. They match and message with one another and agree that their adult-consenting-age children 18C, 18D should meet (go out on a date). The server 14 knows the addresses of those prospective daters and can identify every available physical location associated with the giftcards in the server database around those addresses. For example, if there is not a Ruth's Chris Steak House™ near the daters, the mothers 18A, 18B will not be shown a gift card usable only at Ruth's Chris Steak House. The mothers 18A, 18B will only see gift cards that would be relevant to the location of their children for a potential date. The server then gives the mothers 18A, 18B the opportunity to choose a gift card and share the cost of the gift card. Also, if one of the parents 18A had indicated that her child 18C was highly allergic to seafood, then the mothers 18A, 18B would not be shown a gift card usable only at, for example, "Billy's Crab Shack." Once the gift card is chosen, the potential daters 18C, 18D get an email with instructions and, at that time, or possibly later, each other's contact information. For example, the contact information might not be provided until both daters 18C, 18D agree that their contact information can be revealed.

As an example, if the mothers 18A, 18B bought a $10 gift card to Starbucks™ then their children, i.e., the daters 18C, 18D, would have to meet at Starbucks and, using their smartphones 40, correctly answer two trivia questions about each other to unlock the gift card. The gift card is then displayed on one of the smartphones 40 to allow the purchase of items at Starbucks. The gift card thus helps to overcome a problem of human nature: reluctance to spend money on a date with a total stranger.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention. Accordingly, the disclosed subject matter is intended to embrace all alterations, modifications, and variations, that fall within the scope and spirit of any claims that may be written, for the subject invention.

The foregoing detailed description is intended only to convey to a person having ordinary skill in the art the fundamental aspects of the invention and is not intended to limit, and should not be construed as limiting, the scope of the invention.

The invention claimed is:

1. A system for use with a cellular telephone network and a plurality of smartphones, comprising:
   a server,
      the server being communicatively coupled to the cellular telephone network;
      the server being communicatively coupled to the plurality of smartphones via the cellular telephone network to transmit data to and receive data from the plurality of smartphones;
      the server being communicatively coupled to a first device and a second device;
      the server receiving profile data for a first profile from the first device and profile data for a second profile from the second device;
      the server receiving a request from the first device to identify a profile with profile data compatibility with the profile data of the first profile;
      the server comparing the profile data of the first profile with profile data of other profiles, including the profile data of the second profile, to identify compatible profiles, the second profile being one of the compatible profiles;
      the server reporting the compatible profiles to the first device;
      the server receiving a selection of the second profile from the first device;
      the server allowing the first device and the second device to communicate via the server;
      the server receiving a request for an item from at least one of the first device or the second device;
      the server sending an instruction regarding the item to at least one of a third device or a fourth device, via the cellular telephone network;
      the server receiving a confirmation regarding the instruction from the other of the third device or the fourth device, via the cellular telephone network; and
      the server enabling the item for use by at least one of the third device or the fourth device.

2. The system of claim 1, wherein:
   at least one of the third device or the fourth device is a smartphone.

3. The system of claim 1, wherein:
   the third device and the fourth device are smartphones; and
   the server communicates with the third device and the fourth device via the cellular telephone network.

4. The system of claim 1, wherein:
   the instruction is that the third device be rubbed against the fourth device; and the confirmation is that the third device has been rubbed against the fourth device.

5. The system of claim 1, wherein:
the instruction is a unique code provided to the third device; and
the confirmation is the unique code provided by the fourth device.

6. The system of claim 1, wherein:
the instruction is a unique code provided to the third device;
the server also sends a different instruction to the fourth device, via the cellular telephone network, the different instruction being a link to a website; and
the server receives a confirmation, via a website, that the fourth device has provided the unique code to the website.

7. The system of claim 1, wherein:
the first device provides, to the server, a question regarding an operator of the third device, and an answer to the question; and
the server receives, from the fourth device, the answer to the question.

8. The system of claim 1, wherein:
the second device provides, to the server, a question regarding an operator of the fourth device, and an answer to the question; and
the server receives, from the third device, the answer to the question.

9. The system of claim 1, wherein:
the server has stored an image of a user associated with the fourth device;
the instruction is for the third device to take a picture of the user associated with the fourth device and to send the picture to the server;
the server receives, from the third device, the picture; and
the server compares the image with the picture to verify that the instruction has been performed.

10. The system of claim 1, wherein:
the first device and the second device are smartphones; and
the server communicates with the first device and the second device via the cellular telephone network.

11. A method for operating a server system, comprising:
receiving profile data for a first profile from a first device and profile data for a second profile from a second device;
receiving a request from the first device to identify a profile with profile data compatibility with the profile data of the first profile;
comparing the profile data of the first profile with profile data of other profiles, including the profile data of the second profile, to identify compatible profiles, the second profile being one of the compatible profiles;
reporting the compatible profiles to the first device;
receiving a selection of the second profile from the first device;
allowing the first device and the second device to communicate via the server system;
receiving a request for an item from at least one of the first device or the second device;
sending an instruction regarding the item to at least one of a third device or a fourth device, via the cellular telephone network;
receiving a confirmation regarding the instruction from the other of the third device or the fourth device, via the cellular telephone network; and
enabling the item for use by at least one of the third device or the fourth device.

12. The method of claim 11, wherein:
the server communicates with the third device and the fourth device via a cellular telephone network.

13. The method of claim 11, wherein:
the instruction is that the third device be rubbed against the fourth device; and
the confirmation is that the third device has been rubbed against the fourth device.

14. The method of claim 11, wherein:
the instruction is a unique code provided to the third device; and
the confirmation is the unique code provided by the fourth device.

15. The method of claim 11, wherein the instruction is a unique code provided to the third device; and further comprising:
sending a different instruction to the fourth device, the different instruction being a link to a website; and
receiving a confirmation that the fourth device has provided the unique code to the website.

16. The method of claim 11, and further comprising:
receiving, from the first device, a question regarding an operator of the third device, and an answer to the question; and
receiving, from the fourth device, the answer to the question.

17. The method of claim 11, and further comprising:
receiving, from the second device, a question regarding an operator of the fourth device, and an answer to the question; and
receiving, from the third device, the answer to the question.

18. The method of claim 11, wherein the instruction is for the third device to take a picture of the user associated with the fourth device, and further comprising:
receiving an image of a user associated with the fourth device;
storing the image;
receiving, from the third device, the picture; and
comparing the image with the picture to verify that the instruction has been performed.

19. The method of claim 11, and further comprising communicating with the first device and the second device via the cellular telephone network.

20. The method of claim 11, wherein the item has a value only at a specified location.

* * * * *